United States Patent
Benkreira et al.

(10) Patent No.: US 11,112,909 B1
(45) Date of Patent: Sep. 7, 2021

(54) SYSTEMS FOR REAL-TIME INTELLIGENT HAPTIC CORRECTION TO TYPING ERRORS AND METHODS THEREOF

(71) Applicant: Capital One Services, LLC, McLean, VA (US)

(72) Inventors: Abdelkader M'Hamed Benkreira, New York, NY (US); Nimma Bhusri, McLean, VA (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/090,663

(22) Filed: Nov. 5, 2020

(51) Int. Cl.
*G06F 3/0488* (2013.01)
*G06F 3/041* (2006.01)
*G06F 3/01* (2006.01)
*G06K 9/62* (2006.01)
*G06N 20/00* (2019.01)

(52) U.S. Cl.
CPC .......... *G06F 3/04186* (2019.05); *G06F 3/016* (2013.01); *G06F 3/04886* (2013.01); *G06K 9/6268* (2013.01); *G06N 20/00* (2019.01); *G06F 2203/04803* (2013.01)

(58) Field of Classification Search
CPC .. G06F 3/04188; G06F 3/016; G06F 3/04886; G06F 2203/04803; G06K 9/6268; G06N 20/00
See application file for complete search history.

(56) References Cited

U.S. PATENT DOCUMENTS

| | | | |
|---|---|---|---|
| 8,903,719 B1* | 12/2014 | Landry | H04L 51/063 |
| | | | 704/10 |
| 9,613,022 B2* | 4/2017 | Stewart | G06F 40/263 |
| 2014/0232534 A1* | 8/2014 | Birnbaum | G06F 3/016 |
| | | | 340/407.1 |
| 2017/0269687 A1* | 9/2017 | Hussain | G06F 3/0485 |

\* cited by examiner

*Primary Examiner* — Anil K Bhargava
(74) *Attorney, Agent, or Firm* — Greenberg Traurig, LLP

(57) ABSTRACT

Systems and methods of the present disclosure enable context-aware haptic error notifications. The systems and methods include a processor to receive input segments into a software application from a character input component and determine a destination. A context identification model predicts a context classification of the input segments based at least in part on the software application and the destination. Potential errors are determined in the input segments based on the context classification. An error characterization machine learning model determines an error type classification and an error severity score associated with each potential error and a haptic feedback pattern is determined for each potential error based on the error type classification and the error severity score of each potential error of the one or more potential errors. And a haptic event latency is determined based on the error type classification and the error severity score of each potential error.

20 Claims, 8 Drawing Sheets

SYSTEMS FOR REAL-TIME INTELLIGENT HAPTIC CORRECTION TO TYPING ERRORS AND METHODS THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based systems configured for real-time, intelligent haptic correction for typing errors and methods thereof.

BACKGROUND OF TECHNOLOGY

Despite the many hours spent at a computer, people are still prone to mistyping. When this does happen, one might recognize the error through one's own intuition or through an on-screen interface that detects the error (e.g. Spell-check). However, visual indications may be either intrusive or easily overlooked.

SUMMARY OF DESCRIBED SUBJECT MATTER

In some embodiments, the present disclosure provides an exemplary technically improved computer-based method that includes at least the following steps of receiving, by at least one processor, at least one input segment into a software application of a user computing device from a character input component of the user computing device; wherein the at least one input segment is to be communicated by the software application, via the user computing device to an electronic destination; determining, by the at least one processor, an electronic destination associated with the input segments; where the electronic destination includes: i) an identifier of at least one individual, ii) an identifier of at least one organization, or iii) a combination thereof; utilizing, by the at least one processor, a context identification model to predict a context parameter representing a context classification of the at least one input segment based at least in part on the software application and the electronic destination; determining, by the at least one processor, one or more potential errors in the at least one input segment based at least in part on the context classification; utilizing, by the at least one processor, an error characterization machine learning model to determine an error type classification and an error severity score associated with each potential error of the one or more potential errors; determining, by the at least one processor, a haptic feedback pattern for each potential error of the one or more potential errors based at least in part on the error type classification and the error severity score of each potential error of the one or more potential errors; where the haptic feedback pattern defines at least one of: i) a haptic event duration, ii) a haptic event amplitude, iii) a haptic event pulse pattern, or iv) combinations thereof; determining, by the at least one processor, a haptic event latency associated with a delay for triggering the haptic feedback pattern after each potential error based at least in part on the error type classification and the error severity score of each potential error of the one or more potential errors; and causing, by the at least one processor, a vibration motor of the user computing device to produce the haptic feedback pattern after the haptic event latency for each potential error.

In some embodiments, the present disclosure provides an exemplary technically improved computer-based system that includes at least the following components of a context identification model engine; an error characterization model engine; a haptic feedback engine; and at least one processor in communication with a non-transitory computer readable medium having software instructions stored thereon. The at least one processor is configured to, upon execution of the software instructions, perform steps to: control the context identification model engine to: receive at least one input segment into a software application of a user computing device from a character input component of the user computing device; where the at least one input segment is to be communicated by the software application, via the user computing device to an electronic destination; determine an electronic destination associated with the at least one input segment; where the electronic destination includes: i) an identifier of at least one individual, ii) an identifier of at least one organization, or iii) a combination thereof; control the error characterization model engine to: utilize a context identification model to predict a context parameter representing a context classification of the at least one input segment based at least in part on the software application and the electronic destination; determine one or more potential errors in the at least one input segment based at least in part on the context classification; utilize an error characterization machine learning model to determine an error type classification and an error severity score associated with each potential error of the one or more potential errors; and control the haptic feedback engine to: determine a haptic feedback pattern for each potential error of the one or more potential errors based at least in part on the error type classification and the error severity score of each potential error of the one or more potential errors; where the haptic feedback pattern defines at least one of: i) a haptic event duration, ii) a haptic event amplitude, iii) a haptic event pulse pattern, or iv) combinations thereof; determine a haptic event latency associated with a delay for triggering the haptic feedback pattern after each potential error based at least in part on the error type classification and the error severity score of each potential error of the one or more potential errors; and cause a vibration motor of the user computing device to produce the haptic feedback pattern after the haptic event latency for each potential error by a vibration motor of the user computing device.

Embodiments of systems and methods described herein further include where the context classification includes: i) a type associated with the software application, and ii) a business or personal distinction associated with the destination and the software application.

Embodiments of systems and methods described herein further include communicating, by the at least one processor, an operating system (OS) event to an OS of the user computing device after the haptic event latency of each potential error to cause the OS to actuate the vibration motor according to the haptic feedback pattern.

Embodiments of systems and methods described herein further include where the haptic feedback pattern includes a selection of a vibration pattern from a set of vibration patterns included in an OS of the user computing device.

Embodiments of systems and methods described herein further include where the character input component includes a virtual keyboard on a touchscreen of the user computing device.

Embodiments of systems and methods described herein further include: utilizing, by the at least one processor, an error sensitivity model to determine a sensitivity score representing a degree of sensitivity to errors based at least in part on the context classification and the destination; and generating, by the at least one processor, the haptic feedback pattern where the error severity score exceeds the error sensitivity score.

Embodiments of systems and methods described herein further include where: the error type classification of a potential error of the one or more potential errors includes a transaction amount error; and the error characterization machine learning model is trained to identify the transaction amount error based at least in part on a user input history of transaction amount inputs associated with the context classification of the at least one input segment.

Embodiments of systems and methods described herein further include where: the error type classification of a potential error of the one or more potential errors includes a form field error associated with a user input to a data field of a form in the software application; and the error characterization machine learning model is trained to identify the form field error based at least in part on a user input history of user inputs to the data field associated with the context classification of the at least one input segment.

Embodiments of systems and methods described herein further include where the haptic event latency includes a time-based latency causing the haptic feedback pattern at a predetermined amount of time after detection the one or more potential errors.

Embodiments of systems and methods described herein further include where the haptic event latency includes an event-based latency causing the haptic feedback pattern at an input of the at least one input segment matching a predetermined input event after detection the one or more potential errors.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 8 illustrate systems and methods of correcting typing errors using haptic feedback. The following embodiments provide technical solutions and technical improvements that overcome technical problems, drawbacks and/or deficiencies in the technical fields involving text recognition, natural language error detection and correction, and efficient and effective notification. As explained in more detail, below, technical solutions and technical improvements herein include aspects of improved error detection techniques for more intelligent, context-sensitive detection, and improved notification systems and methods to more effectively. Based on such technical features, further technical benefits become available to users and operators of these systems and methods. Moreover, various practical applications of the disclosed technology are also described, which provide further practical benefits to users and operators that are also new and useful improvements in the art.

Figure 1:
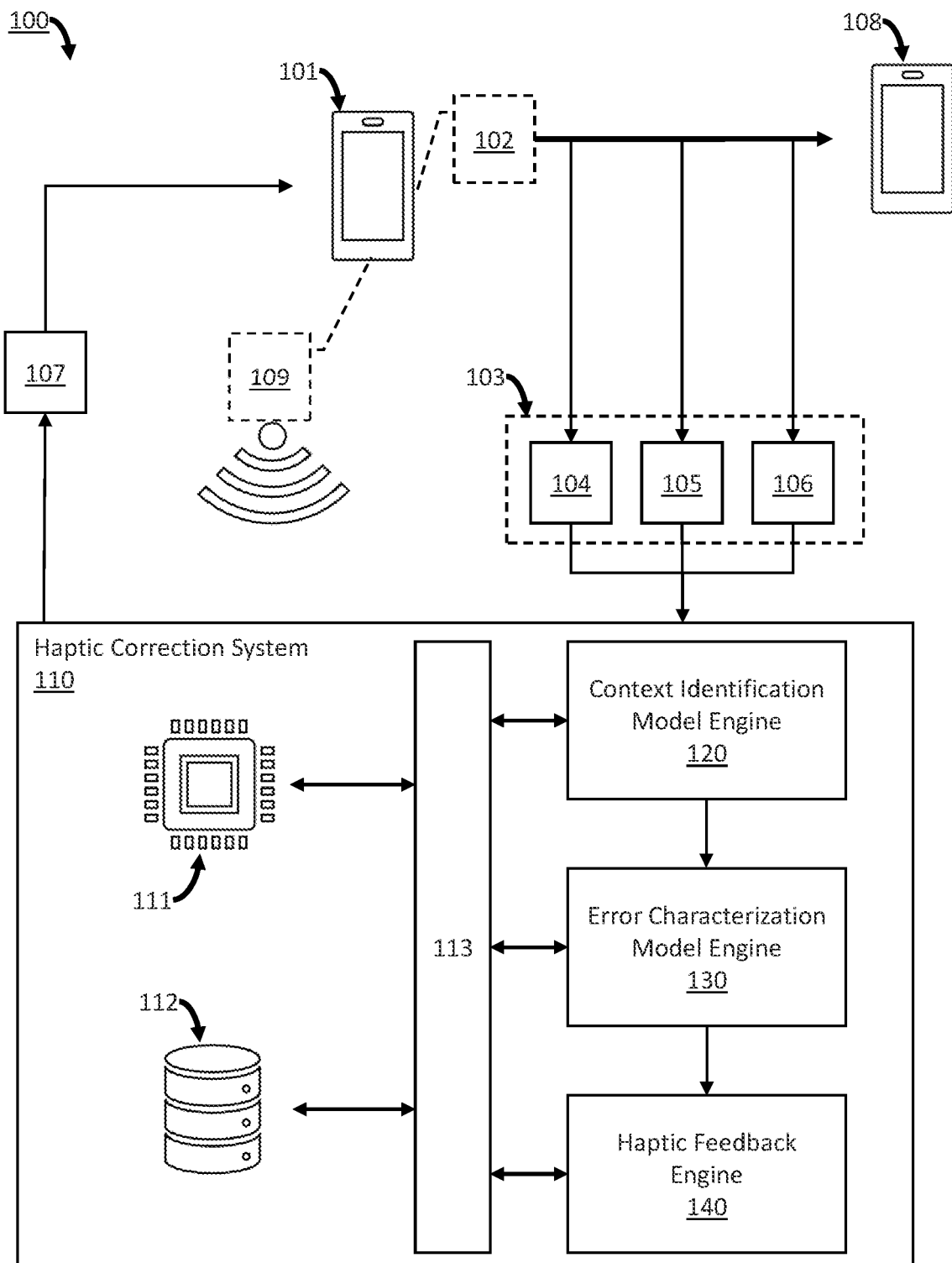
FIGS. 1-8 show one or more schematic flow diagrams, certain computer-based architectures, and/or screenshots of various specialized graphical user interfaces which are illustrative of some exemplary aspects of at least some embodiments of the present disclosure.

FIG. 1 is a block diagram of an exemplary computer-based system for dynamic context and severity recognition in typing settings for real-time, intelligent haptic feedback for typing correction in accordance with one or more embodiments of the present disclosure.

In some embodiments, a user computing device 101 may be equipped with software or hardware, or both, for inputting numbers and text. When entering an input segment 103 text and numbers, users may mis-type portions of the input segment 103. However, such mis-types may go unnoticed until after submitting the input. While visual indicators of mis-typed portions of the input segment 103 may be provided, but often go unnoticed, especially is situations where the user is quickly inputting text and numbers or doing so without looking closely. Thus, the user computing device 101 may be provided with software and/or hardware to provide haptic feedback to typing errors using intelligent, context-based error detection and haptic feedback based on the detected error in at least one input segment 103.

In some embodiments, the input segment 103 may include an entirety of the input by the user. However, in some embodiments, the entirety of the input may include one or more input segments 103, each of which may be analyzed individually or in combination to determine the existence of errors for the purpose of providing haptic feedback to notify the user. Thus, hereinafter, the term "input segment 103" refers to at least one input segment of user input symbols.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

In some embodiments, the user may utilize an input component, such as a physical or virtual keyboard, to input the input segment 103 into a software application running on the user computing device 101. In some embodiments, the input segment 103 may be user provided information for, e.g., communication (e.g., text messages, instant messaging, social media, among others), data fields (e.g., for forms and software applications, among others), or other alphanumeric input.

In some embodiments, depending on the context of the input segment 103, there may be a destination 108 for the input segment 103. In many instances, the destination 108 may be another device, such as a computing device associated with another user, a server, a database, or remotely hosted application, or other destination 108 for the input segment 103. However, in some embodiments, the destination 108 may be a software component, such as, e.g., a data field in a digital form (e.g., a PDF form, or other suitable digital form), a notes application or word processing application among other productivity software (e.g., for spreadsheets, presentations, etc.), a digital assistant, among other software destinations 108.

In some embodiments, the user computing device 101 and/or the destination computing device 102 at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, the input segment 103 may be provided to a haptic correction system 110 to be checked for errors and to alert the user to any detected errors based on the input segment 103 and the context of the input segment 103. Accordingly, to facilitate determining context and errors, the input segment 103 may be provided to the haptic correction system 110, including source data 104, destination data 105, and text segments 106. Herein, text segments 106 refer to strings of one or more alphanumeric, punctuation and special characters in any suitable input field or application, Input fields can include, e.g., text messages (e.g. Simple Message Service (SMS), Multi-Media Message Service (MMS), Rich Communication Service (RCS) or other text message types), instant messages (e.g., any Internet Protocol (IP) based messaging), social media posts, emails, document text, form data fields for, e.g., purchase forms, dates, document data fields, etc., or any other input fields for text segments 106.

In some embodiments, the source data 104 may include context-related data regarding the user and/or user computing device 101. For example, source data 104 may include, e.g., a computing device type (e.g., smartphone, tablet, laptop computer, smartwatch, or other computing device), user data such as a user account including a user profile having information such as name, age, employer, account identifier, contact data (e.g., family contacts, friend contacts, or other contact groups), among other data and combinations thereof.

In some embodiments, destination data 105 may include context-related data identifying the destination 108 and other related information. In some embodiments, the destination 108 may include another user computing device. Such a scenario, the destination data 105 may include context-related data such as, e.g., destination user profile having information such as name, age, employer, account identifier, contact data (e.g., family contacts, friend contacts, or other contact groups), among other data and combinations thereof. In some embodiments, the destination 108 may include a software application for cloud service, such as, e.g., social media, word processing document, spreadsheet document, online ordering application, portable document format (PDF) document, or other application or service. Where the destination 108 is a software application or service, the destination data 105 may include context-related data such as, e.g., an application type, a service type, an application name, a service name, a document type, an entity name of an entity associated with the application or service, an entity name identified in a document of the application or service, a date, among other data and combinations thereof.

In some embodiments, the input segments 106 may also include the text segments 106 that the user of the user computing device 101 inputs to the destination 108. In some embodiments, the text can include any combination of one or more symbols selectable by a user on the user computing device 101. In some embodiments, the symbols can include, e.g., letters, accented letters, numbers, fractions, mathematical operators, currency symbols (e.g., the dollar symbol or euro symbol), punctuation, special characters, emoji, and any other symbol selectable for user input.

In some embodiments, the text segments 106 may be input via a suitable character input component 102, such as, e.g., a keyboard or virtual keyboard associated with the user computing device 101. However, other input devices are also contemplated, such as, e.g., voice dictation, voice instruction (e.g., via a digital assistant such as Apple Siri, Google Assistant, Amazon Alexa, Microsoft Cortana, or other voice instruction mechanism), selection boxes or interface elements, or any other way of inputting the symbols of the text segments 106.

In some embodiments, the input segment 103 may be collected for communication to the haptic correction system 110 using a suitable text monitoring mechanism of the character input component 102. The text monitoring mechanism monitors the symbols input by the user and communicates the symbols, in real-time, to the haptic correction system 110. Thus, as a user inputs symbols for the destination 108, the haptic correction system 110 may receive the symbols.

In some embodiments, the text monitoring mechanism provides the input segment 103 to the haptic correction system 110 before the input segment 103 are submitted to the destination 108 in order to provide the user an opportunity to correct any errors before the destination 108 receives the input segment 103. As a result, the text monitoring mechanism monitors and relays the symbols during a period between input of the symbols and submission to the destination 108. Accordingly, the text monitoring mechanism may be any software component suitable for intercepting the symbols for analysis by the haptic correction system 110 prior to receipt by the destination 108.

In some embodiments, the text monitoring mechanism at the user computing device 101 may include, e.g., an operating system component for monitoring text input such as, a keyboard plug-in, an application or application extension, a browser extension, or any other software component capable of intercepting the input segment 103 for analysis by the haptic correction system 110. In some embodiments, the user computing device 101 may include a virtual keyboard, usable by a touch screen. The text monitoring mechanism may be a function of the virtual keyboard, or a third-party keyboard extension for the virtual keyboard, that monitors selected symbols and provides the selected symbols as input segment 103 to the haptic correction system 110.

In some embodiments, the text monitoring mechanism may include functionality to automatically identify the context-related data of the input segment 103, including the source data 104 and the destination data 105. For example, the text monitoring mechanism may identify characteristics of the input field into which the symbols are being inserted upon user selection. In some embodiments, these characteristics may include source data 104 of a user profile associated with the virtual keyboard, and input field data of the destination 105 such as, e.g., an input field type (e.g., text, numbers, date, monetary amount, etc.) and an application identifier and/or application type hosting the input field (e.g., messaging application, social media application, banking application, word processing application, etc.).

In some embodiments, the text monitoring mechanism may provide the input segment 103 including the source data 104, destination data 105 and text segments 106 to the haptic correction system 110 as the text segments 106 are detected. In some embodiments, the haptic correction system 110 determines a context of the text segments 106, e.g., based on the source data 104 and the destination data 105, and determine errors in the text segments 106 that are not appropriate for the context.

In some embodiments, the haptic correction system 110 may be a part of the user computing device 101, a cloud-driven service, or a hybrid implementation thereof. Thus, the haptic correction system 110 may include hardware and software components including, e.g., user computing device 101 hardware and software, cloud or server hardware and software, or a combination thereof. For example, in some embodiments, the haptic correction system 110 may include hardware and software components of the user computing device 101, such as implementations as part of the software of the virtual keyboard or an application into with the text segments 106 are being input, operating system components, a third-party screen reader, browser extension, or other software and hardware components.

In some embodiments, the haptic correction system 110 may include hardware components such as a processor 111, which may include local or remote processing components. In some embodiments, the processor 111 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 111 may include data-processing capacity provided by the microprocessor. In some embodiments, the microprocessor may include memory, processing, interface resources, controllers, and counters. In some embodiments, the microprocessor may also include one or more programs stored in memory.

Similarly, the haptic correction system 110 may include storage 112, such as local hard-drive, solid-state drive, flash drive or other local storage, or remote storage such as a server or cloud provided storage solution.

In some embodiments, computer engines for providing context-aware error correction with haptic feedback may be implemented in the haptic correction system 110. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, to determine the errors, the haptic correction system 110 may include computer engines including, e.g., a context identification model engine 120 for determining the context of the input segment 103 and detect errors based on the context, an error characterization model engine 130 to determine a type and/or severity of any errors, and a haptic feedback engine 140 to generate the haptic feedback based on the context, type and severity of any detected errors.

In order to implement the various computer engines of the haptic correction system 110, the computer engines may include software and/or hardware components, For example, each computer engine may include a dedicated processor and storage. However, in some embodiments, the computer engines share hardware resources, including the processor 111 and storage 112 of the haptic correction system 110 via, e.g., a bus 113. Thus, each computer engine may include a memory including software and software instructions, such as, e.g. machine learning models and/or logic for the context identification model engine 120, the error characterization model engine 130 and the haptic feedback engine 140.

In some embodiments, the context identification model engine 120 or the error characterization model engine 130, or both may characterize context and errors by implementing machine learning models. In some embodiments, the context identification model engine 120 or the error characterization model engine 130, or both may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the haptic correction system 110 may receive the input segment 103 in real-time or at any time before submission to the destination 108 to provide haptic feedback for any detected errors by first determining the context of the input segment 103 using the context identification model engine 120. Typographical errors or other similar errors in text segments 106 are not always equally important in every scenario. In some scenarios, a minor error to the spelling of a word may be more acceptable than in other scenarios, such as text messaging a friend as opposed to a business related email, or a web search as opposed to a Universal Resource Locator (URL). Indeed, in some cases an error in one context may not even be considered an error in another, such as the use of acronyms or messaging slang (e.g., "LOL" for "Laugh out Loud", "BRB" for "Be right back", "SMH" for "Shaking my Head", etc.). In a formal or business context, such acronyms and slang would be inappropriate and require correction, however when messaging family and friends, the same text would be proper and even desired. Accordingly, in some embodiments, the context identification model engine 120 may employ a machine learning model to determine the context of the input segment 103 for context-aware error detection.

For example, the context identification engine 120 may ingest source data 104 including, e.g., the application into which the input text 106 is being input, and the destination data 105, e.g., a person, organization or form to which the input text 106 is to be submitted. Based on the source data 104 and the destination data 105, the context identification engine 120 implements the machine learning model to classify the context, via classification machine learning (e.g., a convolutional neural network, support vector machine, auto-encoder, clustering, random forest or other architecture and combinations thereof). For example, context classifications may include, e.g., business, personal, communication, social media, finance, or other classification of context. In some embodiments, the context classification may include a numerical classification, such as, e.g., type 1 through type 5 contexts, where the numerical classification indicates a strictness of error detection such that a higher ranked text segment 106 according to the numerical classification is analyzed for stricter conformance to correctness. In some embodiments, a type 1 ranking may be the highest (e.g., strictest) classification, and higher numbers would indicate less strict classifications, although the opposite ordering may be employed with higher numbers indicating stricter tolerance for errors.

In some embodiments, using the context classification for the input segment 103, the context identification model engine 120 may identify any errors in the text segment 106. For example, the context identification model engine 120 may compare words formed by the text segment 106 with a dictionary, e.g., stored in the storage 112. In some embodiments, the dictionary may be pre-established with correct word spellings for each context classification. However, in some embodiments, the dictionary may be built or modified over time as the user provides new input segment 103 and corrects words, or accepts or rejects error suggests by the haptic feedback system. In some embodiments, error detection may be performed by additional machine learning model trained to identify words and phrases or numerical values input as the text segments 106, and recognize correct or incorrect input, or both correct and incorrect input depending on the context. Other suitable techniques for error detection are also contemplated.

In some embodiments, the detected errors may be provided to an error characterization model engine 130. In some embodiments, some errors may warrant earlier or stronger notifications to ensure correction, while other errors may be less severe and can be fixed later without interrupting the user. Thus, the error characterization model engine 130 may provide characterizations of each error for use in determining when and how to provide haptic feedback to a user.

In some embodiments, the error characterization model engine 130 may include an error characterization machine learning model to determine an error type classification and an error severity score for each potential error detected by the context identification model engine 120. In some embodiments, the error characterization model engine 130 implements the error characterization machine learning model to ingest the text segments 106, the potential errors and the context classifications of each potential error. Based on training to predict type, severity and sensitivity, the context identification model engine 120 may produce for each potential error, an error type classification, an error severity classification, an error sensitivity, or a combination thereof.

In some embodiments, the error type classification can include format errors for, e.g., dates, etc., numerical or value errors, such as transaction amount errors. In the example of transaction amount errors, the error characterization machine learning model may be trained to identify transaction amount errors based at least in part on a user input history of transaction amount inputs associated with the context classification of the input segment. Thus, the error characterization machine learning model may be trained on normal transaction amounts, such as, e.g., bill payments, money transfers, withdrawal amounts, etc. and recognize an error based on the amount.

In some embodiments, the error type classification may include a potential spelling or vocabulary error, or a potential grammatical error. In some embodiments, the error characterization model engine 130 may include machine learning models for classifying the potential error according to whether a word is incorrectly spelled, or whether it violates a grammatical rule.

In some embodiments, the error characterization model engine 130 may also or alternatively include components for determining a severity of a potential error, a sensitivity of the context classification to errors, or both. The severity and sensitivity may be employed separately or together to determine whether a potential error is in fact an error given the context of the input segment 103.

In some embodiments, a potential error and its associated error type, severity and sensitivity can be used to determine how feedback is provided to the user at the user computing device 101 prior to submission of the input segment 103 to the destination 108. To do so, the haptic feedback engine 140 may ingest the error type classification, the error severity, the sensitivity, or a combination thereof to generate a haptic event that indicates the error such that the user notices the haptic feedback as indicative of an error without being interrupted or disrupted form continuing input for further input segment 103 (e.g., while typing a message).

In some embodiments, the haptic event may include a haptic feedback pattern 107 defined by a duration, an amplitude, a pulse pattern or a combination thereof of the haptic event. In some embodiments, the haptic feedback pattern 107 is selected from a library of haptic patterns. For example, the storage 112 may include a library of haptic patterns categorized by, e.g., error characterization, error severity, context classification, sensitivity, or a combination thereof Accordingly, the haptic feedback engine 140 may employ the error characterization, error severity, context classification, and sensitivity to match a haptic feedback pattern 107 from the library of haptic patterns.

In some embodiments, rather than a library of haptic patterns, the haptic feedback pattern 107 may be algorithmically generated. For example, a base haptic pattern may be modified according to variations in the error characterization, error severity, context classification, sensitivity or combination thereof. Each of the haptic event duration, amplitude and pulse pattern may be increased or decreased by a certain percent based on the error characterization, error severity, context classification, sensitivity. For example, increased error severity may increase the haptic event amplitude or duration, or both. Similarly, increased sensitivity may increase the haptic event amplitude or duration, or both. Various combinations of selection from a library and algorithmic or logical modification may be employed. In some embodiments, the pulse pattern is selected based on the error type, while severity and sensitivity are used to modify the duration and amplitude.

In some embodiments, the haptic feedback engine 140 also determines a latency for providing the haptic feedback pattern 107 to the user computing device 101. In some embodiments, latency of the haptic event including the haptic feedback pattern 107 may be determined such that the user is most likely to notice the haptic feedback pattern 107 while avoiding disrupting text input. Therefore, the haptic event latency may include a delay for triggering the haptic feedback pattern 107 after each potential error based on the error type classification and the error severity score of each potential error. For examples, haptic feedback may be used to alert the user of the user computing device 101 of errors as soon as an error is made or with specified latency, such as, e.g., time-based or event-based latency definitions (e.g., a number of subsequent keystrokes or a grammatical event).

In some embodiments, haptic event latencies may be time-based, e.g., 2, 3, 5, or 10 seconds after the input of the text segment 106 including a potential error. However, in some embodiments, the haptic event latencies may be event-based, and are thus triggered upon the occurrence of specified events. For example, the haptic event may be triggered after a certain number of keystrokes following the input of the text segment 106 including a potential error, or upon a text segment 106 including a specified grammatical event, such as an end of a sentence or other event indicating a pause in input.

In some embodiments, the haptic feedback engine 140 may vary the haptic event pulse patterns of the haptic feedback pattern 107 based on a type of error according to the error type classification. Thus, the length and number of pulses may be customized to represent to the user the type of error detected, such as, e.g., error type, error severity, or both. For example, more pulses may indicate a potential error that is more egregious, while variations to duration, pitch, amplitude, etc. of each pulse may indicate the type of the error, e.g., a grammatical type, vocabulary, or other type according to the error characterization as described above.

In some embodiments, the resulting haptic feedback pattern 107 is emitted by the user computing device 101 using, e.g., a vibration motor 109. For example, the haptic feedback engine 140, via the processor 111, may instruct the vibration motor 109 to vibrate according to the haptic event pulse pattern, amplitude and duration at the specified haptic event latency. In some embodiments, latency may be controlled by appending a data item including an instruction for conditions to trigger the actuation of the vibration motor 109 (e.g., the event-based trigger or time-based trigger). In some embodiments, the haptic feedback engine 140 delays the haptic feedback pattern 107 until the specified conditions, at which point the vibration motor 109 is immediately instructed to actuate according to the haptic feedback pattern 107.

In some embodiments, the haptic feedback pattern 107 is triggered using, e.g., an operating system event built into the functionality of the operating system of the user computing device 101 to control the vibration motor 109. Accordingly, the vibration motor 109 is triggered upon the specified latency by the haptic feedback engine 140 interfacing with the operating system of the user computing device 101 to control the vibration motor 109 according to the haptic feedback pattern 107. As a result, the user computing device 101 emits a haptic feedback pattern 107 upon the detection of potential errors in input segment 103 contemporaneously with the input of the input segment 103.

As a result, the user receives haptic feedback that is much less likely to go unnoticed than visual feedback, enabling the user to correct potential errors prior to submission of the text segments 106 to the destination 108. Moreover, the haptic feedback pattern 107 enables the representation of not only the existence of a potential error, but also the type and severity of the error based on the context of the input segment 103.

Figure 2:
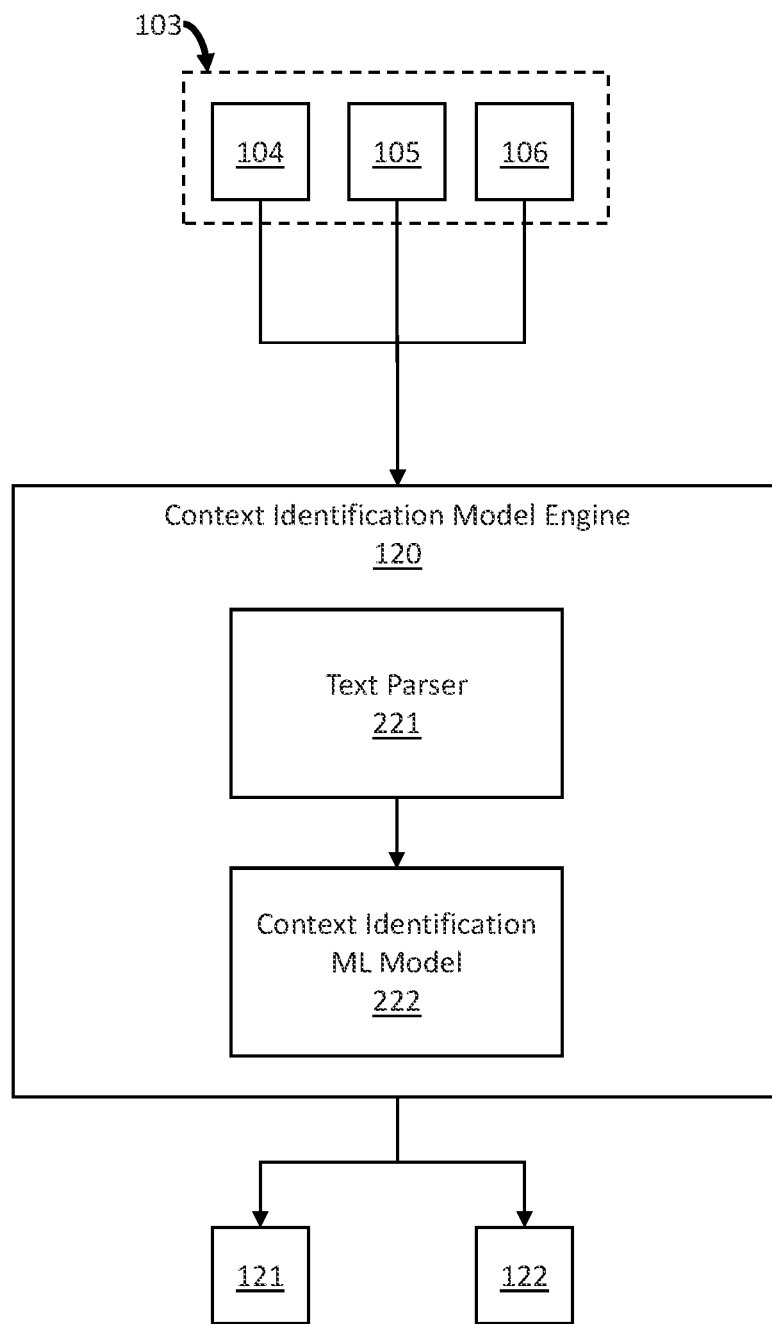

FIG. 2 is a block diagram of another exemplary computer-based system for real-time, intelligent haptic feedback for typing correction in accordance with one or more embodiments of the present disclosure.

In some embodiments, the context identification model engine 120 ingests each input segment 103, including source data 104, destination data 105 and each text segment 106 input by a user via an input mechanism 102 as described above. In some embodiments, the context identification model engine 120 includes computer software and hardware for implementing machine learning models and algorithms for identifying a context of each input segment 103.

In some embodiments, the context identification model engine 120 receives text segments 106 as the user inputs symbols into the user computing device 101. Testing each individual symbol in isolation would not reveal accurate errors or context. Accordingly, the context identification model engine 120 may instantiate a text parser 221 to collect text segments 106 as they are input to identify the text segments 106 that correspond to words, phrases or other information.

In some embodiments, the text parser 221 may simply segment symbols into individual words based on punctuation and spaces (e.g., identifying an input word based on consecutive symbols bounded by spaces, commas, periods, colons and/or semicolons). However, in some embodiments, the text parser 221 may include semantic segmentation to identify words and phrases. As such, the text parser 221 may include a classification machine learning model configured for natural language processor or semantic segmentation, such as, e.g., a convolutional neural network or other deep learning neural network. However, any form of parsing may be employed to identify and extract words or phrases from the text segments 106 in real-time with the context identification model engine 120 receiving the text segments 106.

In some embodiments, the words and phrases of text identified and extracted by the text parser 221 may be passed with the source data 104 and the destination data 105 to a context identification machine learning model 222. In some embodiments, the context identification model engine 120 includes computer software and/or hardware to implement the context identification machine learning model 222 to determine a context of the input segment 103. In some embodiments, the context identification machine learning model 222 may generate a context classification based on trained model parameters. In some embodiments, the trained model parameters represent a correlation between source data 104 and destination data 105 to a particular context of a set of contexts.

In some embodiments, the set of contexts can include, e.g., business contexts, personal contexts, family contexts, friends contexts, official forms contexts, financial forms contexts, social media contexts, among other contexts. These contexts may be deduced from an application type into which the input segment 103 are being input, as well as users, persons or organizations, or other entities associated with the destination 108. For example, a chat message to a contact with a "Family" label may indicate that an informal, family context of the input segment 103. Similarly, an email from a source email account have an email domain address associated with an employer may indicate a business context. Many other factors may be taken into account to determine to what type of context the input segment 103 relate. Accordingly, source data 104 features such as sending account, entity, phone number, etc. and destination data 105 such as destination account, entity, phone number, etc., as well as application type of either the source data 104, the destination data 105 or both, may all be provided as input features to the context identification machine learning model 222.

In some embodiments, using the input features, the context identification machine learning model 222 may generate a classification of the context of the input segment 103. In some embodiments, it may be assumed that each symbol input in the test segments 106 may have the same source data 104 and destination 105 for a given session of text input. A session may be determined based on a loading and closing of the virtual keyboard, of the application used to receive the text segments 106, or other indication of a given input session by the user. Thus, the context identification machine learning model 222 may produce the context classification once for the input session, conserving computation resources by avoiding continually determining context classifications as input segment 103 continue to be received.

In some embodiments, upon implementation of the context identification machine learning model 222, the context identification model engine 120 may output the context classification 121 for the input segment 103 as well as the words 122 identified in the text segments 106. In some embodiments, the context identification model engine 120 may produce the words 122 as a continuous stream as text segments 106 are received and as the text parser 221 identifies words and phrases in the text segments 106.

Figure 3:
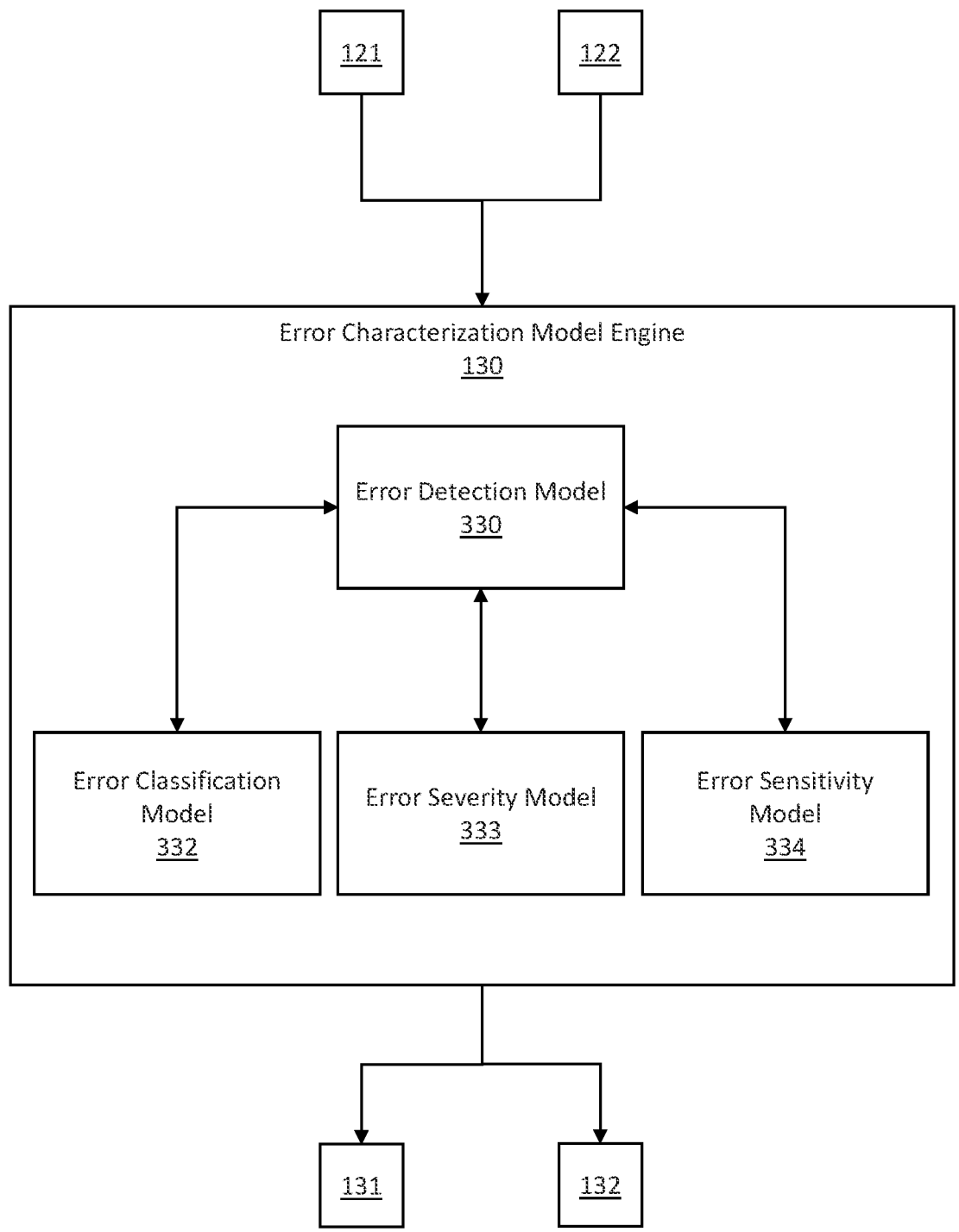

FIG. 3 is a block diagram of another exemplary computer-based system for intelligent error detection and characterization for real-time, intelligent haptic feedback for typing correction in accordance with one or more embodiments of the present disclosure.

In some embodiments, the error characterization model engine 130 may receive the context classification 121 and words 122 of the input segment 103. In some embodiments, an error detection model 330 may detect words 122 that include potential errors, such as typographical errors, misspellings, incorrect words, or grammatical errors, which may be employed with the context classification 121 to determine an error type, and error severity and sensitivity for each potential error.

In some embodiments, the error detection model 330 may identify potential errors by comparing the words 122 to a dictionary. In some embodiments, the dictionary includes a set of properly spelled words. In some embodiments, the set of properly spelled words is customized for each context classification to form context-specific dictionaries such that a context classification for, e.g., personal, family, friends, or informal communication may include slang terms, abbreviations, acronyms, internet slang, emoji, emoticons, and other informal language, while other context classifications may have different context-specific dictionaries. The words 122 may be compared to words in the context-specific dictionary of the context classification 121 and based on a similarity between each word 122 and words in the dictionary, a potential error may be detected. For example, where a particular word 122 does not appear in the context-specific dictionary, the error detection model 330 may flag the particular word 122 as a potential error. In some embodiments, the error detection model 330 may also identify the correct spelling of the word 122 by comparing the word 122 with each word in the context-specific dictionary to identify a word that is most similar to the word 122. For example, the error detection model 330 may identify a dictionary word having the most number of similar letters, the nearest Jaccard distance, or other suitable measure of similarity.

In some embodiments, the error detection model 330 may instead or additionally employ a machine learning model to identify potential errors based on context-specific training. In some embodiments, the error detection model 330 may employ, e.g., semantic segmentation to recognize the natural language semantics of the words 122, e.g., based on individual words 122 and ordered sequences of words 122. Based on the semantic segmentation, the error detection model 330 may determine incorrect words, and thus potential errors.

In some embodiments, where the words 122 are data field entries, such as, e.g., numerical values, dates or other entries the error detection model 330 may be trained based on past user interactions for inputting symbols into similar data fields based on the context classification 121. In some embodiments, the data field is a financial entry, such as a deposit or transfer, and the error detection model 330 is trained based on similar financial entries and the values input into the data fields in the similar financial entries. Thus, the error detection model 330 may detect when the input is incorrect relative to what the user has input in the past.

In some embodiments, the error detection model 330 may interact with an error classification model 332, an error severity model 333 and an error sensitivity model 334 to determine whether a word 122 or words 122 include potential or actual errors. For example, an error sensitivity model 334 may set a threshold sensitivity for identifying and error, while an error severity model 333 may determine the severity of a potential error based on the context and the similarity to the correct dictionary word.

In some embodiments, the error severity model 333 may include a machine learning model that is trained on past user behavior regarding corrections of words. For example, based on a frequency of accepting or ignoring notifications of errors based on a degree of similarity to dictionary words, the error severity model 333 may be trained to determine the severity of a potential error based on how likely the user would be to act on a notification of the error.

In some embodiments, the error severity model 333 includes a combination of assessing a degree of similarity to the dictionary word and machine learning predictions for severity. For example, a weighted average or weighted sum of the degree of similarity and the machine learning severity prediction may form a severity score. However, in some embodiments, the severity score may be either the degree of similarity or the machine learning severity prediction.

In some embodiments, the error sensitivity model 334 may determine a sensitivity score for determining whether a potential error is an actual error. In some embodiments, the error sensitivity model 334 includes a machine learning model having parameters trained to predict a sensitivity score based on past interactions. For example, based on a frequency of accepting or ignoring notifications of errors based on context classification 121 and a type of error, the error sensitivity model 334 may be trained to determine the sensitivity score of a potential error based on how likely the user would be to act on a notification of the error. As a result, the error sensitivity model 334 is trained to predict a sensitivity for error detection responsive to the context, thus providing an indication of the degree of formality for the input segment 103.

In some embodiments, the type of error may be determined by the error classification model 332. In some embodiments, the error classification model 332 may include a machine learning model that ingests the potential error from the error detection model 330 and generates a classification of an error type. In some embodiments, the error classification model 3323 includes parameters to correlate a potential error with the context classification, the destination data 105, the source data 104, or a combination thereof.

In some embodiments, the error classification model 332 generate an error type classification of a transaction amount error based on the destination data 105. Accordingly, the error classification model 332 is trained to identify the transaction amount error based a user input history of transaction amount inputs associated with the context classification of the at least one input segment.

In some embodiments, the error classification model 332 generates an error type classification of a form field error, similar to the transaction amount error. Accordingly, the error classification model 332 is trained to identify the form field error based a user input history of similar form field inputs associated with the context classification of the at least one input segment and the destination data 105 indicating the form.

In some embodiments, the error classification model 332 generates an error type classification of a grammatical error type indicative of a grammar rule violated by the potential error. Accordingly, in some embodiments, the error classification model 332 may include natural language processing, semantic segmentation or other classification technique trained against grammar rules and a training dataset of grammar errors.

In some embodiments, the error classification model 332 generates an error type classification of a spelling error type indicative of a misspelled word 122, e.g., based on the error detection model 330, the context classification 121 and the context-specific dictionaries. Accordingly, in some embodiments, the error classification model 332 may include logic, natural language processing, semantic segmentation or other classification technique configured to recognize spelling errors based on the context-specific dictionaries.

In some embodiments, based on a comparison of the error severity and the error sensitivity for each potential error, the error characterization model engine 230 may determine whether a potential error is an actual error given the context of the input segment 103. In some embodiments, the error characterization model engine 230 may then produce the error type classification 131 and the actual error 132 detected based on the context for context-aware error detection.

Figure 4:
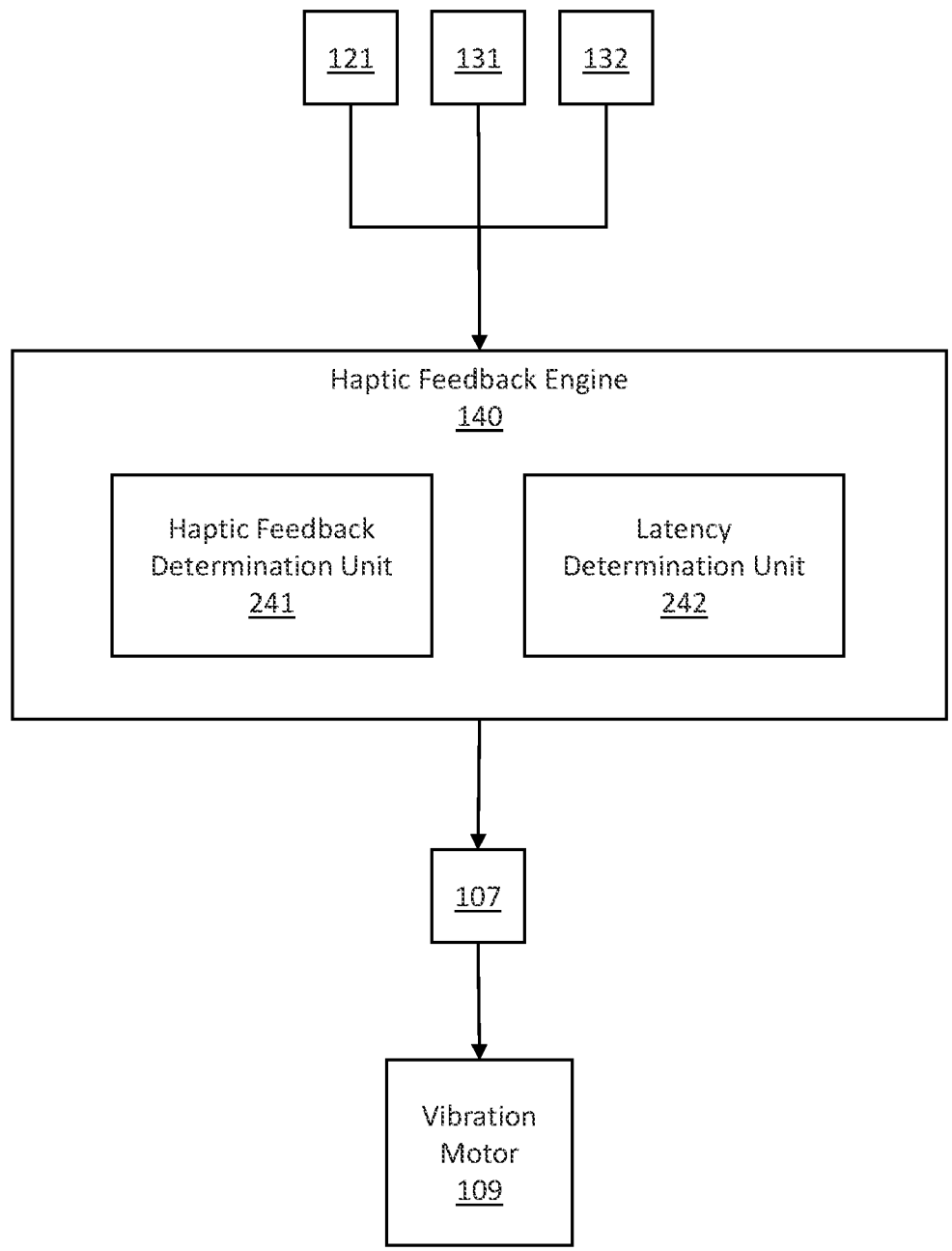

FIG. 4 is a block diagram of another exemplary computer-based system for dynamic haptic feedback for real-time, intelligent haptic feedback for typing correction in accordance with one or more embodiments of the present disclosure.

In some embodiments, the error type classification 131 and the actual error 132 is provided to the haptic feedback engine 140 to generate the haptic feedback pattern 107. In some embodiments, a haptic feedback determination unit 241 determines the pulse pattern, duration and amplitude of the haptic feedback pattern 107 and a latency determination unit 242 determines when to control the user computing device 101 to actuate the vibration motor 109 and generate the haptic feedback pattern 107 as a sequence of vibrations.

In some embodiments, the haptic feedback determination unit 241 may employ an index of vibration patterns, organized by error type classification 131, to select the haptic feedback pattern 107. Accordingly, the haptic feedback determination unit 241 may utilize the error type classification 131 as a reference to identify in the index the matching haptic feedback pattern 131.

In some embodiments, the haptic feedback determination unit 241 may further receive the error severity to modify the haptic feedback pattern 107 to convey the severity of the actual error 132. For example, the pulse pattern of the haptic feedback pattern 107 may be increased in amplitude for stronger pulses to indicate the increased severity, and therefore increased need for the user to correct the error. In some embodiments, the haptic feedback determination unit 241 may instead or additionally increase the duration of the haptic feedback pattern 107 by, e.g., causing the haptic feedback pattern 107 to repeat, and therefore convey the increased need for the user to correct the error.

In some embodiments, the latency determination unit 242 may use the error type classification 131 to determine a latency for controlling the user computing device 101 to emit the haptic feedback pattern 107 via the vibration motor 109. In some embodiments, the haptic event latency is a time-based latency that results in the haptic feedback pattern 107 to be produced by the vibration motor 109 at a predetermined amount of time after detection the actual error 132. In some embodiments, the time-based latency may include, e.g., a 2, 3, 5, 8, 10, 15, or 20 second delay between detection of the actual error 132 and generation of the haptic feedback pattern 107 by the vibration motor 109. In some embodiments, the time-based latency may be varied depending on the error type classification 131. For example, a form field error may utilize a low latency while a spelling or grammatical error may have a longer latency due to the error occurring in a longer input segment 103.

In some embodiments, the latency determination unit 242 may employ an event-based latency. In some embodiments, the event-based latency may trigger the vibration motor 109 to produce the haptic feedback pattern 107 upon the occurrence of a predetermined condition. For example, upon an input of a predetermined input event, such as a grammatical event including a period, colon, parenthesis, quote, or other indication of the end of a sentence or phrase. Such a grammatical event may indicate that the user has paused input and would be more receptive to noticing the haptic feedback pattern 107.

In some embodiments, after the period of latency, the haptic feedback engine 107 may produce the haptic feedback pattern 107 such that the user computing device 101 controls a vibration motor 109 to emit the haptic feedback pattern 107 as a sequence of vibrations. Such a sequence of vibrations may be perceived by the user to notify the user of the error, the type of the error and, in some embodiments, the severity of the error. In some embodiments, the haptic feedback engine 140 may also highlight, underline, or otherwise indicate the text segment 106 corresponding to the actual error 132 on a display of the user computing device 101. Accordingly, the user may both feel and see the actual error 132, enabling the user to correct the error before submission to the destination 108.

Figure 5:
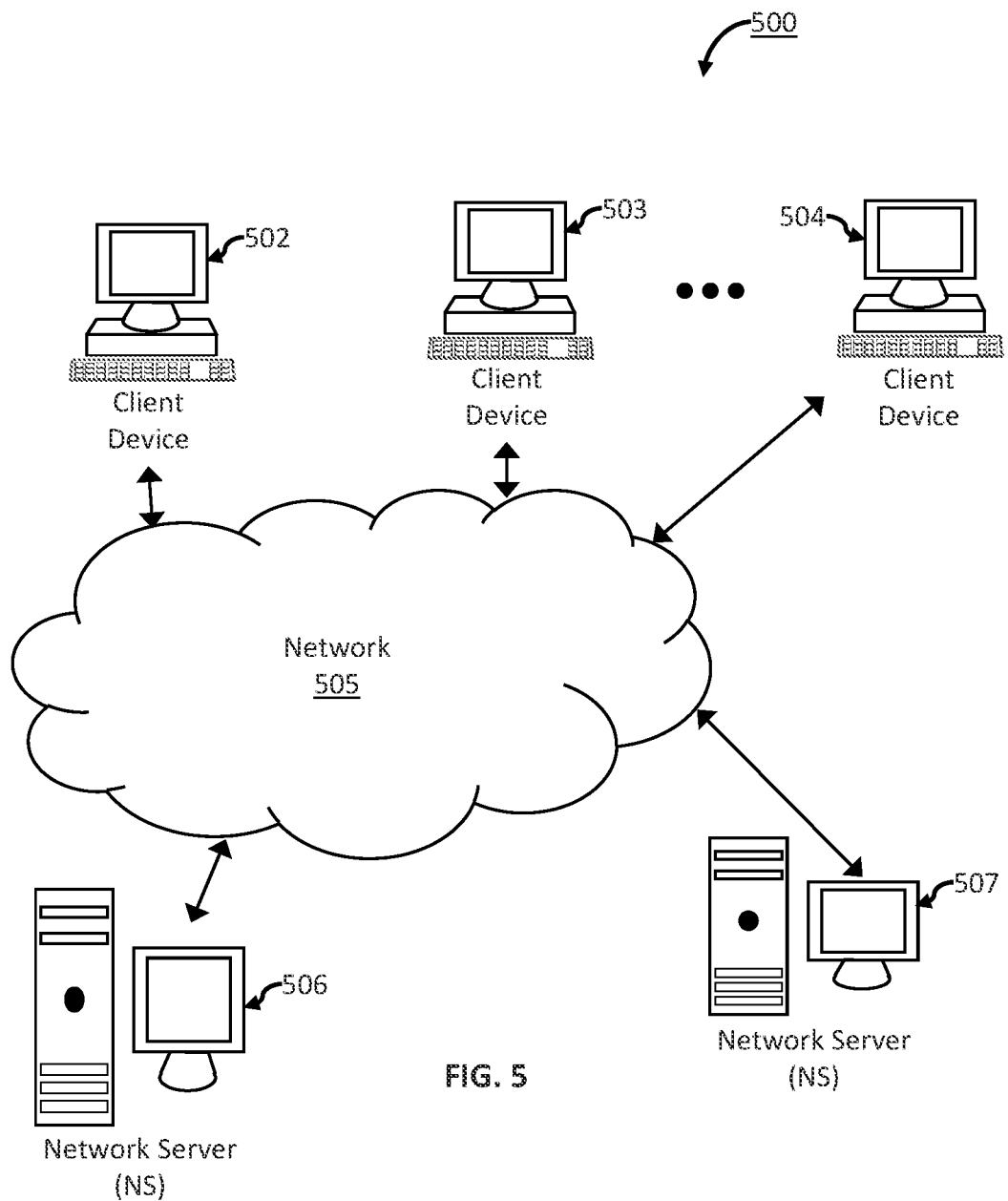

FIG. 5 depicts a block diagram of an exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 500 may be configured to manage a large number of members and concurrent transactions, as detailed herein. In some embodiments, the exemplary computer-based system and platform 500 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 5, members 502-504 (e.g., clients) of the exemplary computer-based system and platform 500 may include virtually any computing device capable of receiving and sending a message over a network (e.g., cloud network), such as network 505, to and from another computing device, such as servers 506 and 507, each other, and the like. In some embodiments, the member devices 502-504 may be personal computers, multiprocessor systems, microprocessor-based or programmable consumer electronics, network PCs, and the like. In some embodiments, one or more member devices within member devices 502-504 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 502-504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 502-504 may include may run one or more applications, such as Internet browsers, mobile applications, voice calls, video games, videoconferencing, and email, among others. In some embodiments, one or more member devices within member devices 502-504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 502-504 may be specifically programmed by either Java, .Net, QT, C, C++ and/or other suitable programming language. In some embodiments, one or more member devices within member devices 502-504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 505 may also include mass storage, such as network attached storage (NAS), a storage area network (SAN), a content delivery network (CDN) or other forms of computer or machine-readable media.

In some embodiments, the exemplary server 506 or the exemplary server 507 may be a web server (or a series of servers) running a network operating system, examples of which may include but are not limited to Microsoft Windows Server, Novell NetWare, or Linux. In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 501-504.

In some embodiments and, optionally, in combination of any embodiment described above or below, for example, one or more exemplary computing member devices 502-504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
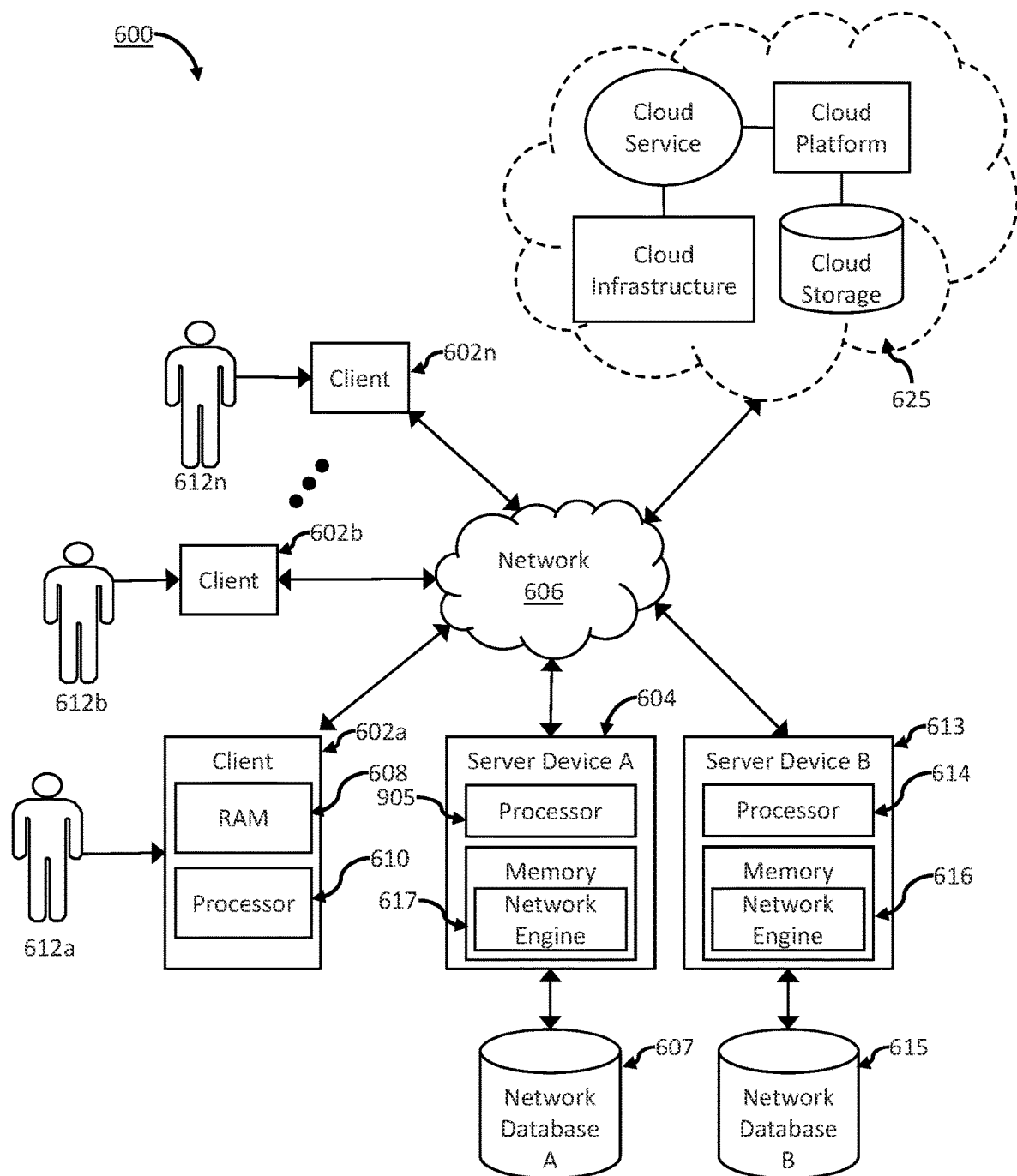

FIG. 6 depicts a block diagram of another exemplary computer-based system and platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 602a, 602b thru 602n shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, and/or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client 602a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 602a through 602n may also comprise a number of external or internal devices such as a mouse, a CD-ROM, DVD, a physical or virtual keyboard, a display, or other input or output devices. In some embodiments, examples of member computing devices 602a through 602n (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, member computing devices 602a through 602n may be specifically programmed with one or more application programs in accordance with one or more principles/methodologies detailed herein. In some embodiments, member computing devices 602a through 602n may operate on any operating system capable of supporting a browser or browser-enabled application, such as Microsoft™ Windows™, and/or Linux. In some embodiments, member computing devices 602a through 602n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 602a through 602n, users, 612a through 602n, may communicate over the exemplary network 606 with each other and/or with other systems and/or devices coupled to the network 606. As shown in FIG. 6, exemplary server devices 604 and 613 may be also coupled to the network 606. In some embodiments, one or more member computing devices 602a through 602n may be mobile clients.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
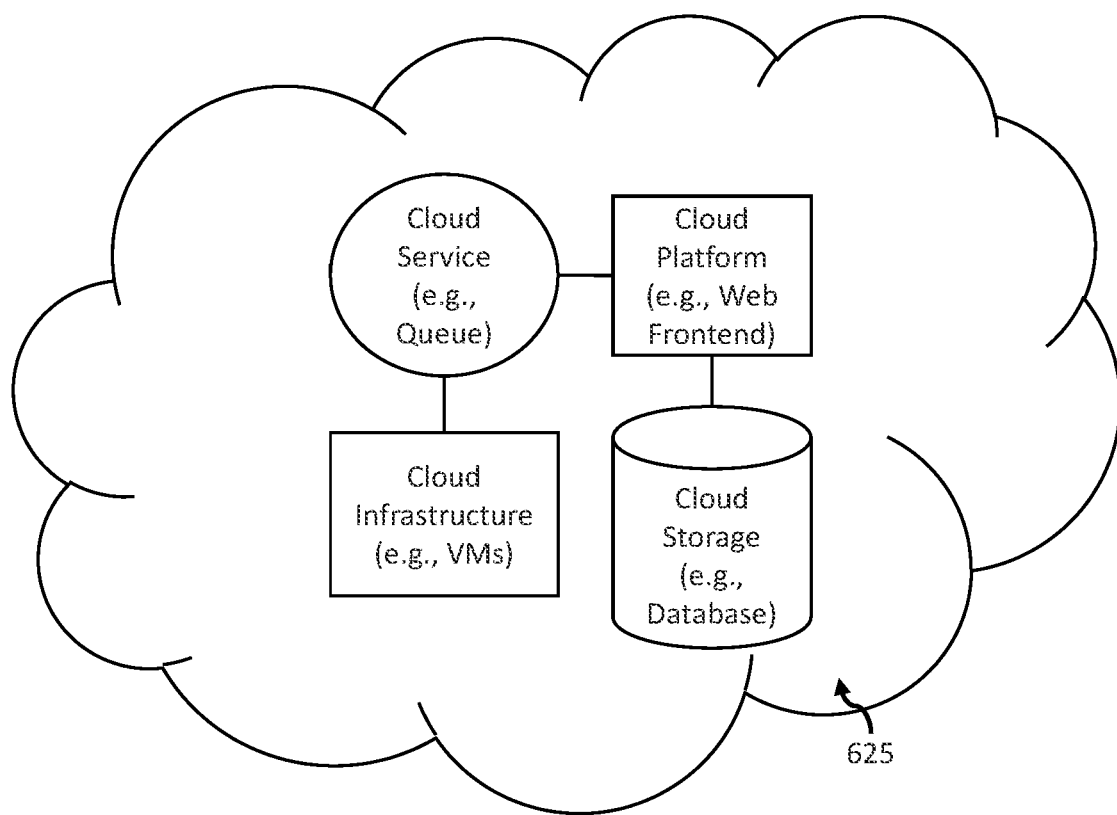
Figure 8:
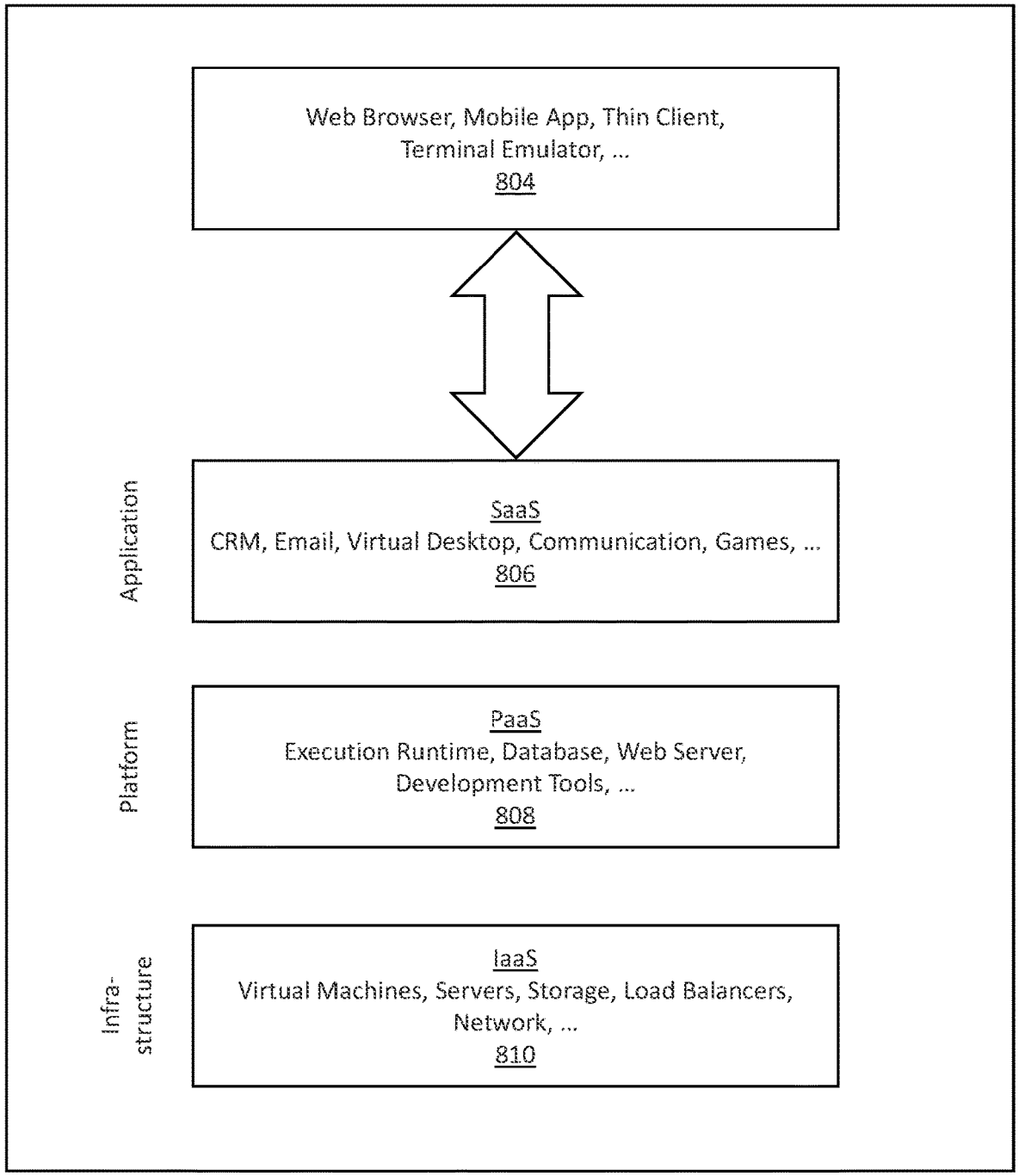

In some embodiments, the exemplary inventive computer-based systems/platforms, the exemplary inventive computer-based devices, and/or the exemplary inventive computer-based components of the present disclosure may be specifically configured to operate in a cloud computing/architecture 625 such as, but not limiting to: infrastructure a service (IaaS) 810, platform as a service (PaaS) 808, and/or software as a service (SaaS) 806 using a web browser, mobile app, thin client, terminal emulator or other endpoint 804. FIGS. 7 and 8 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9, 999), at least 10,000 (e.g., but not limited to, 10,000-99, 999), at least 100,000 (e.g., but not limited to, 100,000-999, 999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999, 999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A method comprising:
receiving, by at least one processor, at least one input segment into a software application of a user computing device from a character input component of the user computing device;
wherein the at least one input segment is to be communicated by the software application, via the user computing device to an electronic destination;
determining, by the at least one processor, an electronic destination associated with the at least one input segment;
wherein the electronic destination comprises:
i) an identifier of at least one individual,
ii) an identifier at least one organization, or
iii) a combination thereof;
utilizing, by the at least one processor, a context identification model to predict a context parameter representing a context classification of the at least one input segment based at least in part on the software application and the electronic destination;
determining, by the at least one processor, one or more potential errors in the at least one input segment based at least in part on the context classification;
utilizing, by the at least one processor, an error characterization machine learning model to determine an error type classification and an error severity score associated with each potential error of the one or more potential errors;
determining, by the at least one processor, a haptic feedback pattern for each potential error of the one or more potential errors based at least in part on the error type classification and the error severity score of each potential error of the one or more potential errors;
wherein the haptic feedback pattern defines at least one of:
i) a haptic event duration,
ii) a haptic event amplitude,
iii) a haptic event pulse pattern, or
iv) combinations thereof;
determining, by the at least one processor, a haptic event latency associated with a delay for triggering the haptic feedback pattern after each potential error based at least in part on the error type classification and the error severity score of each potential error of the one or more potential errors; and
causing, by the at least one processor, a vibration motor of the user computing device to produce the haptic feedback pattern after the haptic event latency for each potential error.

Clause 2. A system comprising:
a context identification model engine;
an error characterization model engine;
a haptic feedback engine; and
at least one processor in communication with a non-transitory computer readable medium having software instructions stored thereon, wherein the at least one processor is configured to, upon execution of the software instructions, perform steps to:
control the context identification model engine to:
receive at least one input segment into a software application of a user computing device from a character input component of the user computing device;

wherein the at least one input segment is to be communicated by the software application, via the user computing device to an electronic destination;

determine an electronic destination associated with the at least one input segment;

wherein the electronic destination comprises:
i) an identifier of at least one individual,
ii) an identifier of at least one organization, or
iii) a combination thereof;

control the error characterization model engine to:

utilize a context identification model to predict a context parameter representing a context classification of the at least one input segment based at least in part on the software application and the electronic destination;

determine one or more potential errors in the at least one input segment based at least in part on the context classification;

utilize an error characterization machine learning model to determine an error type classification and an error severity score associated with each potential error of the one or more potential errors;

control the haptic feedback engine to:

determine a haptic feedback pattern for each potential error of the one or more potential errors based at least in part on the error type classification and the error severity score of each potential error of the one or more potential errors;

wherein the haptic feedback pattern defines at least one of:
i) a haptic event duration,
ii) a haptic event amplitude,
iii) a haptic event pulse pattern, or
iv) combinations thereof;

determine a haptic event latency associated with a delay for triggering the haptic feedback pattern after each potential error based at least in part on the error type classification and the error severity score of each potential error of the one or more potential errors; and cause a vibration motor of the user computing device to produce the haptic feedback pattern after the haptic event latency for each potential error by a vibration motor of the user computing device.

Clause 3. The systems and methods of clauses 1 and/or 2, wherein the context classification comprises:
i) a type associated with the software application, and
ii) a business or personal distinction associated with the destination and the software application.

Clause 4. The systems and methods of clauses 1 and/or 2, further comprising communicating, by the at least one processor, an operating system (OS) event to an OS of the user computing device after the haptic event latency of each potential error to cause the OS to actuate the vibration motor according to the haptic feedback pattern.

Clause 5. The systems and methods of clauses 1 and/or 2, wherein the haptic feedback pattern comprises a selection of a vibration pattern from a set of vibration patterns included in an OS of the user computing device.

Clause 6. The systems and methods of clauses 1 and/or 2, wherein the character input component comprises a virtual keyboard on a touchscreen of the user computing device.

Clause 7. The systems and methods of clauses 1 and/or 2, further comprising:

utilizing, by the at least one processor, an error sensitivity model to determine a sensitivity score representing a degree of sensitivity to errors based at least in part on the context classification and the destination; and generating, by the at least one processor, the haptic feedback pattern where the error severity score exceeds the error sensitivity score.

Clause 8. The systems and methods of clauses 1 and/or 2, wherein:

the error type classification of a potential error of the one or more potential errors comprises a transaction amount error; and the error characterization machine learning model is trained to identify the transaction amount error based at least in part on a user input history of transaction amount inputs associated with the context classification of the at least one input segment.

Clause 9. The systems and methods of clauses 1 and/or 2, wherein:

the error type classification of a potential error of the one or more potential errors comprises a form field error associated with a user input to a data field of a form in the software application; and the error characterization machine learning model is trained to identify the form field error based at least in part on a user input history of user inputs to the data field associated with the context classification of the at least one input segment.

Clause 10. The systems and methods of clauses 1 and/or 2, wherein the haptic event latency comprises a time-based latency causing the haptic feedback pattern at a predetermined amount of time after detection the one or more potential errors.

Clause 11. The systems and methods of clauses 1 and/or 2, wherein the haptic event latency comprises an event-based latency causing the haptic feedback pattern at an input of the at least one input segment matching a predetermined input event after detection the one or more potential errors.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A method comprising:

receiving, by at least one processor, at least one input segment into a software application of a user computing device from a character input component of the user computing device;

wherein the at least one input segment is to be communicated by the software application, via the user computing device to an electronic destination;

determining, by the at least one processor, an electronic destination associated with the at least one input segment;

wherein the electronic destination comprises:
i) an identifier of at least one individual,
ii) an identifier of at least one organization, or
iii) a combination thereof;

utilizing, by the at least one processor, a context identification model to predict a context parameter representing a context classification of the at least one input segment based at least in part on the software application and the electronic destination;

determining, by the at least one processor, one or more potential errors in the at least one input segment based at least in part on the context classification;

utilizing, by the at least one processor, an error characterization machine learning model to determine an error type classification and an error severity score associated with each potential error of the one or more potential errors;

determining, by the at least one processor, a haptic feedback pattern for each potential error of the one or more potential errors based at least in part on the error type classification and the error severity score of each potential error of the one or more potential errors;

wherein the haptic feedback pattern defines at least one of:
  i) a haptic event duration,
  ii) a haptic event amplitude,
  iii) a haptic event pulse pattern, or
  iv) combinations thereof;

determining, by the at least one processor, a haptic event latency associated with a delay for triggering the haptic feedback pattern after each potential error based at least in part on the error type classification and the error severity score of each potential error of the one or more potential errors; and causing, by the at least one processor, a vibration motor of the user computing device to produce the haptic feedback pattern after the haptic event latency for each potential error.

2. The method of claim 1, wherein the context classification comprises:
  i) a type associated with the software application, and
  ii) a business or personal distinction associated with the destination and the software application.

3. The method of claim 1, further comprising communicating, by the at least one processor, an operating system (OS) event to an OS of the user computing device after the haptic event latency of each potential error to cause the OS to actuate the vibration motor according to the haptic feedback pattern.

4. The method of claim 1, wherein the haptic feedback pattern comprises a selection of a vibration pattern from a set of vibration patterns included in an OS of the user computing device.

5. The method of claim 1, wherein the character input component comprises a virtual keyboard on a touchscreen of the user computing device.

6. The method of claim 1, further comprising:
  utilizing, by the at least one processor, an error sensitivity model to determine a sensitivity score representing a degree of sensitivity to errors based at least in part on the context classification and the destination; and
  generating, by the at least one processor, the haptic feedback pattern where the error severity score exceeds the error sensitivity score.

7. The method of claim 1, wherein:
the error type classification of a potential error of the one or more potential errors comprises a transaction amount error; and
the error characterization machine learning model is trained to identify the transaction amount error based at least in part on a user input history of transaction amount inputs associated with the context classification of the at least one input segment.

8. The method of claim 1, wherein:
the error type classification of a potential error of the one or more potential errors comprises a form field error associated with a user input to a data field of a form in the software application; and
the error characterization machine learning model is trained to identify the form field error based at least in part on a user input history of user inputs to the data field associated with the context classification of the at least one input segment.

9. The method of claim 1, wherein the haptic event latency comprises a time-based latency causing the haptic feedback pattern at a predetermined amount of time after detection the one or more potential errors.

10. The method of claim 1, wherein the haptic event latency comprises an event-based latency causing the haptic feedback pattern at an input of the at least one input segment matching a predetermined input event after detection the one or more potential errors.

11. A system comprising:
a context identification model engine;
an error characterization model engine;
a haptic feedback engine; and
at least one processor in communication with a non-transitory computer readable medium having software instructions stored thereon, wherein the at least one processor is configured to, upon execution of the software instructions, perform steps to:
control the context identification model engine to:
  receive at least one input segment into a software application of a user computing device from a character input component of the user computing device;
    wherein the at least one input segment is to be communicated by the software application, via the user computing device to an electronic destination; and
  determine an electronic destination associated with the input segments;
    wherein the electronic destination comprises:
    i) an identifier of at least one individual,
    ii) an identifier of at least one organization, or
    iii) a combination thereof;
control the error characterization model engine to:
  utilize a context identification model to predict a context parameter representing a context classification of the at least one input segment based at least in part on the software application and the electronic destination;
  determine one or more potential errors in the at least one input segment based at least in part on the context classification; and
  utilize an error characterization machine learning model to determine an error type classification and an error severity score associated with each potential error of the one or more potential errors;
control the haptic feedback engine to:
  determine a haptic feedback pattern for each potential error of the one or more potential errors based at least in part on the error type classification and the error severity score of each potential error of the one or more potential errors;
    wherein the haptic feedback pattern defines at least one of:
    i) a haptic event duration,
    ii) a haptic event amplitude,
    iii) a haptic event pulse pattern, or
    iv) combinations thereof;
  determine a haptic event latency associated with a delay for triggering the haptic feedback pattern after each potential error based at least in part on the error type classification and the error severity score of each potential error of the one or more potential errors; and cause a vibration motor of the user computing device to produce the haptic feedback pattern after the haptic event latency for each potential error.

12. The system of claim 11, wherein the context classification comprises:
  i) a type associated with the software application, and
  ii) a business or personal distinction associated with the destination and the software application.

13. The system of claim 11, wherein the at least one processor is further configured to implement software instructions causing the at least one processor to perform steps to communicate an operating system (OS) event to an OS of the user computing device after the haptic event latency of each potential error to cause the OS to actuate the vibration motor according to the haptic feedback pattern.

14. The system of claim 11, wherein the haptic feedback pattern comprises a selection of a vibration pattern from a set of vibration patterns included in an OS of the user computing device.

15. The system of claim 11, wherein the character input component comprises a virtual keyboard on a touchscreen of the user computing device.

16. The system of claim 11, wherein the at least one processor is further configured to implement software instructions causing the at least one processor to perform steps to:
  utilize an error sensitivity model to determine a sensitivity score representing a degree of sensitivity to errors based at least in part on the context classification and the destination; and
  generate the haptic feedback pattern where the error severity score exceeds the error sensitivity score.

17. The system of claim 11, wherein:
the error type classification of a potential error of the one or more potential errors comprises a transaction amount error; and
the error characterization machine learning model is trained to identify the transaction amount error based at least in part on a user input history of transaction amount inputs associated with the context classification of the at least one input segment.

18. The system of claim 11, wherein:
the error type classification of a potential error of the one or more potential errors comprises a form field error associated with a user input to a data field of a form in the software application; and
the error characterization machine learning model is trained to identify the form field error based at least in part on a user input history of user inputs to the data field associated with the context classification of the at least one input segment.

19. The system of claim 11, wherein the haptic event latency comprises a time-based latency causing the haptic feedback pattern at a predetermined amount of time after detection the one or more potential errors.

20. The system of claim 11, wherein the haptic event latency comprises an event-based latency causing the haptic feedback pattern at an input of the at least one input segment matching a predetermined input event after detection the one or more potential errors.

* * * * *